Aug. 2, 1938.     D. E. OLSHEVSKY     2,125,396
CONNECTING DEVICE
Filed May 4, 1935

INVENTOR.
Dimitry Eugene Olshevsky
BY
Stephen Cerstvik
ATTORNEY.

Patented Aug. 2, 1938

2,125,396

UNITED STATES PATENT OFFICE 2,125,396

CONNECTING DEVICE

Dimitry Eugene Olshevsky, East Orange, N. J., assignor to Bendix Aviation Corporation, South Bend, Ind., a corporation of Delaware Application May 4, 1935, Serial No. 19,885

2 Claims. (Cl. 189—36)

The present invention relates generally to devices for connecting a plurality of members together, and more particularly to devices for connecting together three or more members.

Heretofore, in connection with devices of this character, serious difficulties have presented themselves when it was desired to disconnect one of several members connected together by an element extending through all of said members and the disconnection of one of said members had to be effected without disturbing the respective positions of the remaining members. Such a difficulty presents itself, for example, in a case where some kind of structure is secured to a casing by means of cap screws, said screws extending through the casing and supporting some other structure on the other side of said casing. In such a case removal of the screws in order to separate one of said structures would result in objectionable separation of the second of said structures. In cases where an outside structure, such as some kind of attachment or fitting, is to be separated from the main assembly for the purpose of repairs, such separation is so difficult, that the entire main assembly may have to be taken to the repair shop, which would result in a great inconvenience and expense.

Accordingly one of the objects of the present invention is to provide novel means for connecting together three or more members whereby separation of one of said members is permitted without disturbing or affecting the positions of the other members.

The above and other objects and advantages of the invention will appear more fully hereinafter from the consideration of the detailed description which follows, taken together with the accompanying drawing wherein one embodiment of the invention is illustrated. It is to be expressly understood, however, that the drawing is for the purpose of illustration and description only and is not designed as a definition of the limits of the invention, reference being had for this purpose to the appended claims.

In the drawing, wherein like reference characters refer to like parts throughout the several views, Fig. 1 is a plan view of a portion of casing to which two other members are secured with the aid of the novel connecting device of the invention;

Figure 1:
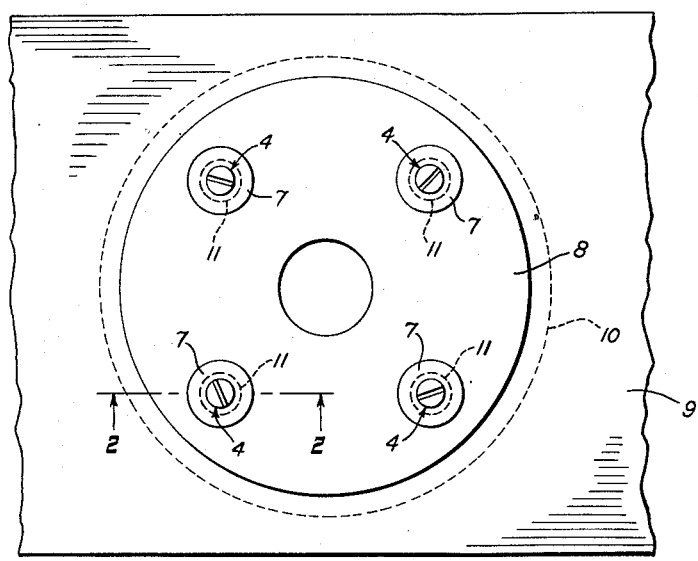

Referring to the drawing, the connecting device embodying the invention in the form shown comprises a parent connecting element which extends through all members connected together, and is adapted to engage the extremely located members. In the present embodiment said parent connecting element is shown as a screw-element 4 having a head 5 and a threaded shank 6, and is provided with a cooperating washer-member 7. In the illustrated example, said screw-element 4 extends through and connects together three members designated as 8, 9 and 10, the inside member 9 being constituted by a casing to which the outside or extremely located member 8, a pressure fitting, is secured, said screw-element 4 supporting at the same time the other extremely located member 10 inside of casing 9.

Elements 8, 9 and 10 are provided with holes arranged in substantial alinement. The hole 11 in the fitting 8 is made of larger diameter than the diameter of the head 5, in consequence whereof the head 5 may pass through said hole 11 unless it is restrained by the washer-member 7. Said hole 11 is counter-bored to a suitable depth to receive the washer-member 7, thus providing means operating to keep the hole 11 in a proper alinement with the holes in the members 9 and 10. The hole in the member 9 is made of a suitable diameter to receive the shank 6 of the screw-member 4, but does not permit passing of the head 5. The hole in the member 10 is provided with an internal screw thread adapted to engage the externally threaded shank 6 of the screw-element 4, thus constituting means operating to engage one extremity of the parent connecting element 4.

Figure 2:
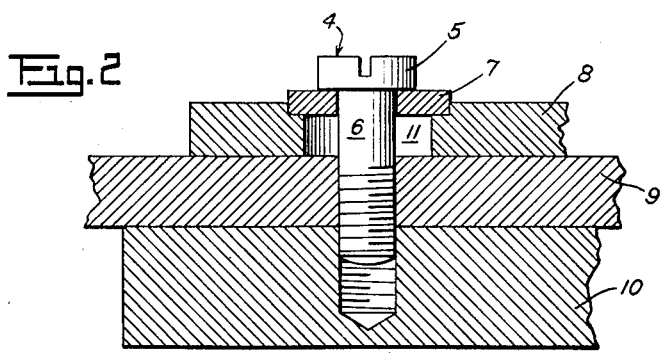
Fig. 2 is a cross sectional view of one of the novel connecting devices, taken on line 2—2 of Fig. 1.
Figure 3:
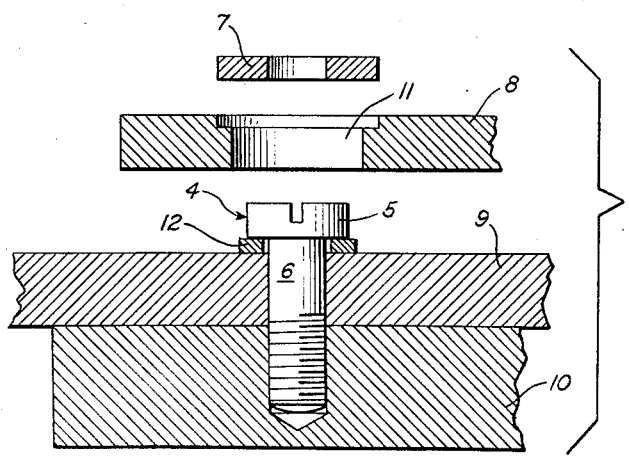
Fig. 3 is a similar view of the connecting device of Fig. 2 showing one of the members separated.

In an assembled position, such as illustrated in Fig. 2, the screw-element 4 is engaged by its threaded shank 6 into the internally threaded hole of the member 10, and inasmuch as washer-member 7 supports head 5 of the screw-element 4 and does not permit same to pass through the hole 11, all three members 8, 9 and 10 are firmly and securely held together.

Several of the novel connecting devices may be used in specific instances depending upon requirements. As shown in Fig. 1, four of them are used for fastening pressure fitting 8 and member 10 to the casing 9. Referring to the construction shown in said Fig. 1, when it becomes necessary to remove the pressure fitting 8 without disturbing the position of the member 10 with respect to the member 9, such separation is effected by disengaging the screw-element 4 from the internally threaded hole of the member 10 and taking it out, and then removing the washer-member 7, whereupon the screw-member 4 is again inserted into the hole and, upon engaging its threaded portion into the threaded hole of the member 10, it is tightened down, the head 5 pressing then directly upon the member 9. A lock washer 12 may be used, if desired, when the screw-member 4 is re-inserted. It should be understood that screw-elements 4, 4 are not to be taken out all at the same time, but one at a time, so that when one of said screw-elements is removed, the others remain in their places. After all of the washer-members 7, 7 are thus removed in the above-described manner, the member 8 may be separated and the position of the member 10 with respect to the member 9 will not be affected by such separation.

There are thus provided novel means for connecting together three or more members whereby separation of one of the extremely located members is possible without disturbing the relative positions of the remaining members. It is apparent that the novel connecting device of the invention may be advantageously employed in numerous instances. It may be used, for example, for fastening pressure fittings to a directional gyroscope assembly; for attaching various brackets to electric motor assemblies, particularly accessories to motor leads; for attaching shipping metal shields to glass windows held by screwed or bolted rings, without disassembling and by using bolts already present; for attaching special lenses to standard optical units; and so on. It is to be expressly understood, however, that these adaptations are given solely for the purpose of illustrating the application of the novel connecting device to specific instances, and that they shall not be construed as giving a definition of the limits of the invention.

Although only one embodiment of the invention has been illustrated and described, other changes and modifications in the form and arrangement of parts, which will now appear to those skilled in the art, may be made without departing from the scope of the invention. Reference is, therefore, to be had to the appended claims for a definition of the limits of the invention.

What is claimed is:

1. In combination with three members adapted to be fastened together in contacting relationship and provided with holes having a common axis, the holes in one of the outside members being tapped and the holes in the other outside member being of a larger diameter than the diameters of the holes in the other two members and counter-bored, and a plurality of connecting devices, each comprising a screw-element having a threaded shank for engaging the internal threads of one of said tapped holes and having a slotted head adapted to pass rotatively into one of said enlarged holes, a removable washer-member adapted to fit into the counter-bore of one of said enlarged holes and operating therewith to prevent said head from passing into said enlarged hole when all three members are to be fastened together, and operating to keep said screw-element in the center of said enlarged hole, said screw-elements being removable one at a time for removal of the associated washer-members and being replaceable so that the heads thereof pass into the enlarged holes in the other outside member and contact the intermediate member, whereby the last-named outer member may be removed after all the washer-members have been removed and the screw-elements have been reassembled with the other two members.

2. In combination with three members adapted to be connected together and provided with a plurality of holes, the holes of each member being arranged in substantial alignment with the holes of the other members, the holes in one of the outside members being provided with internal screw threads and the holes of the other outside member being enlarged, a plurality of devices for connecting said members together, each device comprising a screw-element that extends through the holes of the intermediate and said second-named outside member and into the hole in said first-named outside member, said element being provided with a slotted head that has smaller transverse dimensions than said enlarged holes, said hole thereby permitting rotative movement of said head therein to a position where said head abuts the intermediate member, said element having an external screw thread on its end remote from the head, adapted to engage the internally threaded hole of said one outside member, and a removable element adapted, when in place, to prevent said head from passing into said enlarged hole when the three members are to be fastened together, the screw elements being removable one at a time for removal of the associated removable elements and being replaceable so that the heads thereof pass into the enlarged holes in said other outside member and abut the intermediate member, whereby the said last-named outer member may be removed after all of the removable elements have been removed and the screw-elements have been reassembled with the other two members.

DIMITRY EUGENE OLSHEVSKY.